United States Patent [19]
Buehler et al.

[11] Patent Number: 5,316,578
[45] Date of Patent: May 31, 1994

[54] PROCESS AND APPARATUS FOR PRODUCING STARCH MELT AND PRODUCTS OBTAINABLE BY THIS PROCESS

[75] Inventors: Friedrich S. Buehler, Thusis; Josef Casanova, Bonaduz; Hansjörg Ernst, Domat/Ems; Hans-Joachim Schultze, Chur, all of Switzerland

[73] Assignee: Ems-Inventa AG, Switzerland

[21] Appl. No.: 890,563

[22] Filed: May 28, 1992

[30] Foreign Application Priority Data

May 29, 1991 [DE] Fed. Rep. of Germany ..... 41176286

[51] Int. Cl.$^5$ .......................... C08L 3/04; C08L 3/06; C08L 3/08
[52] U.S. Cl. ..................................... 106/210; 106/211; 264/211; 264/555; 536/102; 536/107; 536/111
[58] Field of Search ................ 106/210, 211; 264/555, 264/211; 536/102, 107, 111

[56] References Cited

U.S. PATENT DOCUMENTS

| | | | |
|---|---|---|---|
| 3,963,679 | 6/1976 | Ullrich et al. | 264/211 |
| 4,248,812 | 2/1981 | Kobashi et al. | 264/211 |
| 4,673,438 | 6/1987 | Wittwer | 106/126 |
| 4,790,881 | 12/1988 | Wittwer et al. | 106/210 |
| 4,900,361 | 2/1990 | Sachetto et al. | 106/210 |

FOREIGN PATENT DOCUMENTS 409781 1/1991 European Pat. Off. .
14938 12/1990 PCT Int'l Appl. .

OTHER PUBLICATIONS

Starch: Chemistry and Technology, Academic Press, 1984 pp. 342–349.

*Primary Examiner*—David Brunsman
*Attorney, Agent, or Firm*—Jordan B. Bierman

[57] ABSTRACT

A process for the production of a homogeneous, thermoplastically processible melt. The process includes a. introduction of chemically modified starch into an intake zone of an extruder and conveyance thereof to a receiving zone, b. addition of a prehomogenized liquid mixture of plasticizer, emulsifier, and additives, followed by mixing and further conveyance of the starch liquid mixture through the receiving zone at elevated temperature, c. destructurization of the modified starch without adding any water and conveyance of the starch and mixture at elevated temperature to form a homogeneous, thermoplastically processible melt, d. degassing of the melt at elevated temperature and under reduced pressure, and e. extrusion thereof through a die at elevated temperature and pressure.

30 Claims, 1 Drawing Sheet

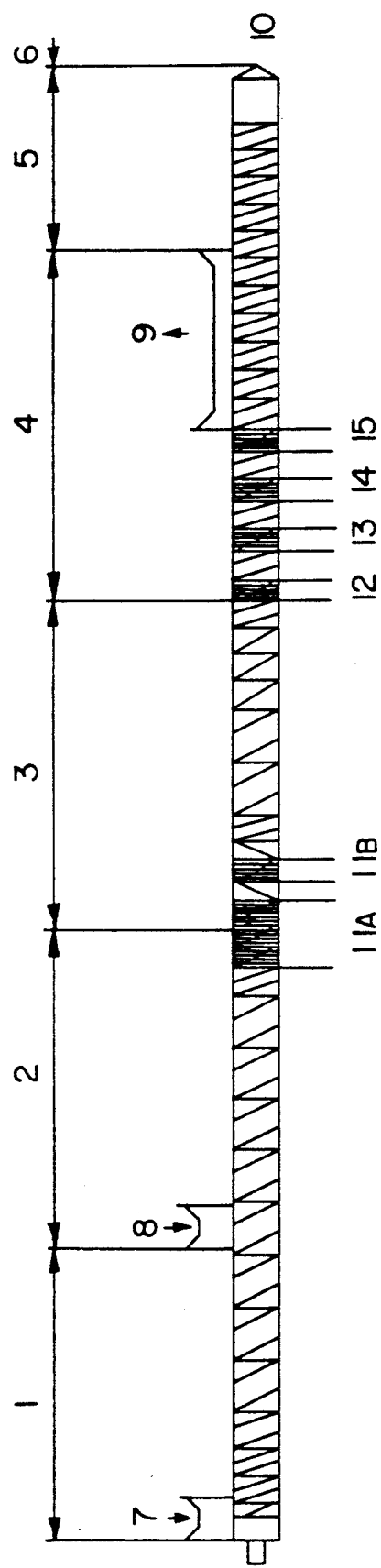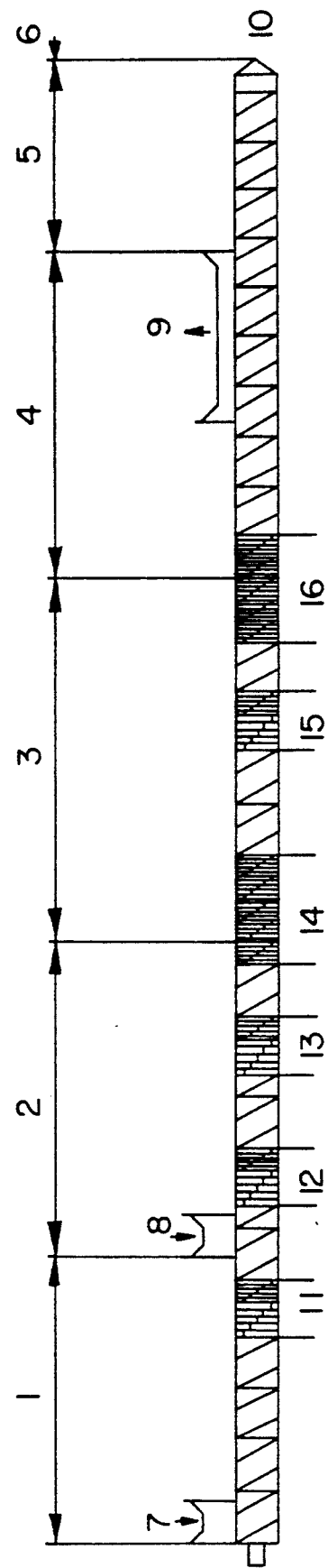

PROCESS AND APPARATUS FOR PRODUCING STARCH MELT AND PRODUCTS OBTAINABLE BY THIS PROCESS

The invention relates to a process for producing a homogeneous, low-viscosity, thermoplastically processible starch melt from chemically modified starch obtained by reaction of its OH-groups with urea, alkylene oxides, and/or other ether, ester, urethane, carbamate, or isocyanate-forming substances. At least a plasticizer and further additives are also included. The invention also relates to an apparatus for carrying out this process, and to the homogeneous, low-viscosity, thermoplastically processible starch melt which is the product thereof.

The invention relates to a starch melt derived from chemically modified starch having a melt viscosity of 500 to 30,000 Pa.s, measured at 160° C. and 236.4 N in a Göttfert melt flow viscosimeter, and to thermoplastically shaped parts produced therefrom, such as granulates, films, sheets, hollow articles, or laminates.

BACKGROUND OF THE INVENTION

It is desirable to use starch, which is a vegetable carbohydrate, as a natural plastic material, in various areas employing known methods of plastics processing. Owing to their granular structure, however, natural starches must be destructurized before they can be thermoplastically processed.

U.S. Pat. No. 4,673,438 describes a six-stage injection molding process for producing a shaped article from a starch-water composition having a water content of 5% to 30% by weight. A disadvantage of the high water content is that a special apparatus is required so that the plasticizer water does not escape in the form of steam at the high processing temperatures.

WO-OS 90/05 161 describes a process for producing thermoplastically processible starch, wherein the reduction of the melt temperature of the starch or starch derivatives is achieved by addition of at least 5% to 35% by weight of additives having a defined solubility parameter. WO-OS 90/14 938 provides a process for producing a shaped article from water and starch material having a high amylose content; the process includes degasification.

The methods of both of the above-mentioned WO Applications have certain disadvantages. When employing processes which are normal in the plastics industry in which the additives (for example plasticizers) are introduced into the polymer melt in the solid state downstream of the feed zone, inhomogeneities in the starch melt and the granulates derived therefrom are produced. Thus, the remainder of the processing operation is impaired as, for example, by strand breakages. Moreover, it is not possible to produce a homogeneous, thermoplastically processible starch melt with apparatus customary in the plastics industry and designed for the processing of polymers. The prior art lacks the necessary teaching for this.

Furthermore, the usual method of controlling the melt viscosity via the plasticizer content has proven unsuitable, as the necessary large quantities of plasticizers also reduce the stability of the melt so that the melt stream tears; this is particularly disadvantageous during the production of films.

BRIEF DESCRIPTION OF THE INVENTION

It is accordingly an object of the invention to provide a process for producing a homogeneous, thermoplastically processible melt from chemically modified starch, plasticizer, and other additives, wherein added water is not required and a trouble free processing operation is obtained. The invention also includes an apparatus for carrying out the process and the low-viscosity starch melt with high melt stability which is a product thereof. The product is especially useful for the production of shaped parts, in particular starch sheets and film which solidify rapidly, exhibit minimum embrittlement, and have a low water uptake. In the present specification and claims all parts and percentages are by weight and all percentages are based on the total composition, unless otherwise stated.

DETAILED DESCRIPTION OF THE INVENTION

It has surprisingly been found that a low-viscosity starch melt having high melt stability can be produced if the plasticizer content is reduced and certain emulsifiers and additives are included. If, for example, urea or urea derivatives are used as the additive, the flowability is reduced but not the toughness. Such a starch melt is particularly suitable for the production of flat and blow molded film.

It has also surprisingly been found that the destructurization of the starch granules can be achieved in minimum space if the kneading elements are arranged in a closed kneading chamber which allows intensive processing of the starch; this kneading chamber is located a certain distance downstream of the addition of the liquid mixture components. In the above-mentioned prior art, the kneading zone is upstream of the addition of the additives (which may be solid or liquid), and several separate kneading zones are placed directly downstream thereof.

A process according to the invention comprises
a. introduction of a chemically modified starch into a first intake zone of an extruder and conveyance of said starch to a second receiving zone,
b. addition of a prehomogenized, anhydrous liquid mixture of plasticizer, emulsifier, and at least one additive, mixing and subsequent conveyance of said starch and said mixture through said second receiving zone at a first elevated temperature to form a blended mixture thereof,
c. destructurization, in the third destructuring zone, of said modified starch without adding any water and conveyance of said blended mixture therethrough at a second elevated temperature to form a homogeneous, thermoplastically processible starch melt,
d. degassing of said melt in and conveyance of said melt through a fourth degassing zone at a third elevated temperature and under reduced pressure to form a degassed melt, and
e. extrusion of said melt through a die at a fourth elevated temperature and elevated pressure.

Advantageously, the process may be modified by introducing the starch and a solid plasticizer into the intake zone of the extruder. The prehomogenized, anhydrous liquid will then contain the emulsifier and the additive(s). The remainder of the process is unchanged.

In a preferred embodiment of the process, a solid first plasticizer, preferably having a melting point above 60°

C., is introduced separately with the chemically modified starch into the intake zone of the extruder. A second, liquid plasticizer, preferably having a melting point below 60° C., is prehomogenized with the emulsifiers and additives, and is introduced into the second receiving zone.

The chemically modified starch used according to the invention is produced by reaction of its OH groups with urea, alkylene oxides, and other ether-, ester-, urethane-, carbamate-, or isocyanate-forming substances. Hydroxyalkyl, acetyl, or carbamate starches or mixtures thereof are preferred. The chemically modified starch desirably has a native water content of about 5% to 16% by weight A water content of 8% to 12% is particularly preferred. The degree of substitution of the chemically modified starch is 0.05 to 3.0, preferably 0.05 to 0.2. The amylose content of the starch is 20% to 100%, preferably 50% to 100%, particularly preferably 65% to 100%.

The plasticizer is an organic compound having at least one hydroxyl group, and is preferably a polyol. Of especial note are sorbitol, mannitol, D-glucose, glycerol, polyethylene glycol, ethylene glycol, propylene glycol, or mixtures thereof. It is used in quantities of 4.8% to 39.8%, preferably 9.8% to 39.8%, most preferably 25% to 30%.

According to the invention, urea or urea derivatives or mixtures thereof are the preferred additives and are desirably prehomogenized in the liquid plasticizer with the emulsifier, which usefully has a hydrophilic-lipophilic balance (HLB) value of 0 to 20, preferably of 10 to 20, at 60° C. Suitable emulsifiers include metal stearates, glycerol monostearate, polyoxyethylene (20)-sorbitan monolaurate, polyoxyethylene (20)-sorbitan monopalmitate, polyoxyethylene (40)-stearate, polyoxyethylene (100)-stearate, and mixtures thereof.

The quantities of emulsifier used are 0.1% to 2%, preferably 0.1% to 1%, most preferably about 0.2%. As an aid to the emulsifiers, 0.1% to 5%, preferably 0.1% to 2%, most preferably about 2%, of additive urea or urea derivatives or mixtures thereof is used. However, other additives which correspond to the prior art and are normal for such thermoplastic materials can be introduced into kneading zones 12 to 15 in quantities of 0% to 5%.

In the process according to the invention, the starch and the liquid mixture of plasticizer, emulsifier, urea or urea derivative, and optional additive(s) or a melt thereof is advantageously exposed to elevated temperatures of about 100° C. to about 170° C., preferably about 120° C. to 150° C., during steps a through e. In step d, it is desirably subjected to reduced pressure of about $-2.5 \times 10^4$ Pa to about $-6 \times 10^4$ Pa ($-0.25$ to $-0.6$ bar), preferably to about $-4 \times 10^4$ Pa ($-0.4$ bar). In step e, an elevated pressure of about $2 \times 10^6$ Pa to about $1 \times 10^7$ Pa (20 to 100 bar) is advantageous, preferably $3 \times 10^6$ to $6 \times 10^6$ Pa (30 to 60 bar).

The invention also includes the product of the foregoing process, i.e. a homogeneous, low-viscosity, thermoplastically processible starch melt having a melt viscosity of 500 to 30,000 Pa.s, preferably 1,000 to 20,000 Pa.s, at 160° C. and 236.4N. The particularly preferred composition has a melt viscosity of 2,000 to 10,000 Pa.s at 160° C. and 236.4 N.

The inventive apparatus for carrying out the process of the invention consists of an extruder having a. heated first inlet chamber containing at least one first conveying element, b. a second heated receiving chamber downstream of said first chamber and containing at least one second conveying element, c. a heated third destructurization chamber downstream of said second chamber, containing kneading and retaining elements, d. a heated fourth degassing chamber under reduced pressure downstream of said destructurization chamber, said degassing chamber containing at least one third conveyor element, and e. a heated fifth extrusion chamber downstream of said degassing chamber being under elevated pressure and having at least one fourth conveying element.

Furthermore, the extruder preferably has at least one device for solids of process step a, a liquid metering device for process step b, a degassing fitting for process step d, and a die for process step e. The die may be of any desired geometry, and the degassed melt of the invention can be pressed either into an injection mold or extruded into the open where it can optionally be further shaped. A twin screw extruder having closely meshing screws which run in the same direction is particularly preferred.

Essential to the invention is a closed, preferably two-stage kneading chamber which is formed by retaining elements and has kneading elements preferably in both a right-hand and left-hand thread designs. To incorporate other additives known to the prior art, the screw can have further kneading elements in a conventional arrangement before the degassing chamber.

The homogeneous starch melt can be further processed into thermoplastically shaped parts. For this purpose, a granulate which is stable in storage and used for the production of such parts, is preferably first produced from the melt. The thermoplastically shaped parts can then be produced by injection molding, blow molding, extrusion, coextrusion, injection stamping, etc. The melt is especially useful for the production of granulates, film, and sheets, hollow articles, and laminates.

BRIEF DESCRIPTION OF THE DRAWINGS

In the accompanying drawings, constituting a part hereof, and in which like reference characters indicate like parts, FIG. 1 is a diagrammatic side view of the apparatus of the present invention; and FIG. 2 is a view similar to that of FIG. 1 of a prior art device.

Referring more specifically to FIG. 1, extruder 17 is provided with a plurality of heating zones 1 to 6. The starch to be processed is introduced into intake zone 1 through inlet 7. Inlet 7 is advantageously equipped with two solid metering devices (not shown). Screw 18 conveys the starch to zone 2 and the prehomogenized liquid, containing plasticizer, emulsifier, and additive(s), is added through a liquid metering device (not shown) and feed opening 8.

In the event that a plasticizer with a melting point above 60° C. is used, it can alternatively be introduced via a second solid metering device (not shown) through inlet 7 into inlet zone 1. In this case, both the starch and the plasticizer are conveyed from zone 1 into receiving zone 2. At that point, the emulsifier and remaining additive(s) are added in liquid form. It is also within the scope of the invention to use both a high melting plasticizer and a low melting plasticizer. In such a case, the solid plasticizer is introduced through inlet 7 and the liquid plasticizer is introduced through feed opening 8.

This mixture is further conveyed by screw 18 into closed kneading chambers 11A and 11B located between zone 2 and zone 3. Kneading chambers 11A and 11B are at least partially closed by retaining elements and may be a single stage or, preferably, two stages. Kneading chambers 11A and 11B are relatively small compared to the overall length of extruder 17; this feature minimizes the torque necessary to drive screw 18 and permits intensive blending and kneading of the mixture being treated in a small space. This is a great advantage compared to the devices of the prior art which require high torques because the kneading elements are distributed along the screw.

The mixture is further conveyed through zone 3 to form a melt. The melt is then conveyed to the degassing zone 4 where the released gas exits through degassing fixture 9 located at the end of zone 4. Thereafter, the melt is conveyed through zone 5 and, in zone 6, the pressure is elevated and the melt is forced through dye 10. The resultant material is cooled, granulated, and/or shaped thereafter. Should further additives be desired, they may be introduced at kneading zones 12, 13, 14, and 15. However, this aspect of the invention is optional and according to the prior art.

FIG. 2 is a view, similar to that of FIG. 1, showing a device according to the prior art. First zone 1 and heated zones 2 to 6 are provided, along with inlet 7 permitting the introduction of starch into inlet zone 1. Kneading zone 11 is located upstream of feed opening 8 and additional kneading zones 12 to 16 are also provided. Fitting 9 permits gases to vent from degassing zone 4 and die 10 determines the shape of the extrusion.

The process of the present invention has numerous advantages. It permits operation without the necessity of incorporating any external or added water. It has been found that there is less shrinkage of the products produced from the melt of the present invention; thus, the shapes made from the melt are more stable than those of the prior art. This is believed to be due to the high rate of solidification of the inventive melts.

The products have good mechanical properties (such as flexibility), as there is little or no embrittlement. Granules produced in accordance with the present invention have excellent shelf life due to their low water uptake. Moreover, their high stability at low melt viscosities means that such low viscosity melts retain the toughness needed to produce sheet materials.

The apparatus of the present invention allows regulation of the solidification rate of the melt by control of the dynamic pressure upstream of the dye. This is possible because of the degasification step. In addition, high throughputs are obtained since no blockage of the screw occurs because excessive torque is avoided. The small, closed kneading zone provides complete destructurization and plasticization of the starch.

The following Examples and Comparison Examples are intended to illustrate the present invention without being limitative. The water contents in the examples were determined by the Karl Fischer method and the melt viscosities are measured at 160° C. and 236.4 N in a Göttfert melt flow viscosimeter. To determine the impact strength, test pieces are produced from the starch granulate and measured at room temperature in accordance with DIN 53 453.

EXAMPLE 1

Extruder data:

| a) Zones: | 1 | Room temperature |
|---|---|---|
| | 2 | 130° C. |
| | 3 | 130° C. |
| | 4 | 100° C. |
| | 5 | 100° C. |
| | 6 | 150° C. | b) Pressure (zone 6): $3 \times 10^6$ to $4 \times 10^6$ Pa (30–40 bar)

c) Torsional moment: 70% d) Reduced pressure (zone 4): $-4 \times 10^4$ Pa ($-0.4$ bar)

Using the apparatus of FIG. 1, 70 parts of hydroxypropyl corn starch having a degree of substitution of 0.06 and an amylose content of 50% (based on the starch), and 12.8 parts of sorbitol are introduced separately at inlet 7 into inlet zone 1 of synchronous closely meshing twin screw extruder 17 having a screw length to diameter ratio of 41, and were simultaneously mixed and conveyed therein.

At 60° C., 0.2 parts of magnesium stearate is dissolved, along with 2 parts of urea, in 15 parts of glycerol. This prehomogenized mixture is introduced through feed opening 8 into zone 2 and is then mixed and conveyed to kneading zones 11A and 11B. After destructurization of the starch and complete plasticization of the starch mixture in kneading chambers 11A and 11B in zones 2 and 3 to form a homogeneous melt, the starch melt is degasified by application of reduced pressure at fitting 9 in zone 4. After passing through zone 5, the homogeneous, thermoplastically processible starch melt is extruded through die 10 in zone 6 as a strand having a slight strand enlargement (die: 3 mm, strand: 4 mm). It is then cooled and granulated. The yellowish granulate has a water content of 5% to 8%; the water content of the starch used as the starting material is 9% to 12%. The homogeneous, thermoplastically processible starch melt produced in this way has a melt viscosity of 3,000 Pa.s at 160° C. and 236.4N and is suitable, for example, for the production of sheets at 100° to 200° C. on an apparatus which is conventional in the plastics industry.

EXAMPLE 2

The procedure of Example 1 is repeated except that hydroxyethyl potato amylose having a degree of substitution of 0.1 (amylose content: 100%) is used as the starting starch. The extruded strand exhibits no enlargement, the qranulate produced therefrom has a water content of 5 to 8%; the water content of the starting amylose is 10%.

| Color | glass-clear |
|---|---|
| Melt viscosity | 2,000 Pa.s at 160° C. and 236.4 N |
| Impact strength | no breakage |

EXAMPLE 3

The procedure of Example 1 is repeated except that hydroxypropyl corn starch having a degree of substitution of 0.1 and an amylose content of 70% (based on the starch) is used as the starting starch. The extruded strand has slight strand enlargement (die: 3 mm, strand: 4 mm), and the granulate produced therefrom has a water content of 5% to 8%, as compared to 9% to 12% of the starting starch.

| Color | yellowish |
|---|---|
| Melt viscosity | 2,500 Pa.s at 160° C. and 236.4 N |
| Impact strength | no breakage. |

EXAMPLE 4

The procedure of Example 1 is repeated except that 70% of hydroxypropyl corn starch having a degree of substitution of 0.1 and an amylose content of 20% (based on the starch) is used as the starting starch. The extruded strand swells markedly (die: 3 mm, strand: 6 mm); the granulate produced therefrom has a water content of 5% to 8% compared to 9% to 12% of the starting starch.

| Color | transparent |
|---|---|
| Melt viscosity | 6,000 Pa.s at 160° C. and 236.4 N |
| Impact strength | no breakage. |

COMPARISON EXAMPLE 1

Extruder data:

| a) Zones: | 1 | Room temperature |
|---|---|---|
| | 2 | 120° C. |
| | 3 | 100° C. |
| | 4 | 100° C. |
| | 5 | 120° C. |
| | 6 | 120° C. | b) Pressure (zone 6): $3 \times 10^6$ to $4 \times 10^6$ Pa (30–40 bar)
c) Torsional moment: 115% (throughput 6 kg/h).

A synchronous closely meshing twin screw extruder having 6 heating zones (ZSK-30 produced by Werner and Pfleiderer) with screw geometry according to FIG. 2 and a screw length diameter ratio of 41 is used. This device is conventional in the plastics industry. 69 parts of native potato starch, 15 parts of glycerol, 15 parts of water, and 1 part of magnesium stearate are pre-mixed in an intensive mixer, are metered into zone 1 via a weighing belt at inlet 7, and are extruded according to the prior art. The starch mass requires such high torsional moments that the screws are blocked. The extruded strand contains unplasticized starch powder and swells markedly after passing through die 10 (diameter: 3 mm, strand: 8 mm). After cooling for 24 hours, the extruded starch strand breaks when bent due to embrittlement.

| Melt viscosity | not measurable (160° C./236.4 N) |
|---|---|
| Impact strength | not measurable |
| Color | glass-clear |

COMPARISON EXAMPLE 2

The procedure of Comparison Example 1 is repeated except that the torsional moment is 80% to 90% (throughput: 6 kg/h) and corn starch having an amylose content of 70% (based on the starch) is used instead of potato starch. The extruded strand swells (die: 3 mm, strand: 6 mm) and contains non-plasticized starch powder. After cooling for 24 hours, the extruded starch strand breaks when bent due to embrittlement.

| Color | brown, cloudy |
|---|---|
| Melt viscosity | not measurable (160° C./236.4 N) |
| Impact strength | not measurable. |

COMPARISON EXAMPLE 3

The procedure of Comparison Example 1 is repeated except that the torsional moment is 100% (throughput: 6 kg/h); and 70 parts of corn starch having an amylose content (based on the starch) of 70% is introduced at inlet 7 into zone 1 of extruder 17. After passing through first kneading zone 11, 30 parts of glycerol is introduced into heated zone 2 via a liquid metering device at feed opener 8. The plasticizer is incorporated into the starch in the two following kneading zones 12 and 13 (heating zones 2 and 3). Destructurization of the starch granules and plasticization take place in a further kneading zone 14 (heating zone 3). The further kneading zones 15 and 16 (heating zone 3 and 4) prior to degasification (heating zone 4) allow the incorporation of further additives, if any. The issuing extruded strand is free from starch powder inclusions and exhibits only slight strand enlargement (die: 3 mm, strand: 4 mm). The strand remains flexible and no embrittlement occurs. The granulate produced from the extruded starch strand has a water content of 5 to 7% compared to a water content of 10% of the corn starch used.

| Color | cloudy, yellowish |
|---|---|
| Melt viscosity | not measurable (160° C./236.4 N) |
| Impact strength | no breakage |

COMPARISON EXAMPLE 4

The procedure of Comparison Example 3 is repeated except that the torsional moment is 100% (throughput: 6 kg/h). 70 parts of corn starch having an amylose content (based on the starch) of 70% and 15 parts of sorbitol are introduced separately into zone 1 of extruder 17 at inlet 7. After passing through first kneading zone 11, 15 parts of glycerol is introduced via a liquid metering device at feed opening 8. Strand enlargement and flexibility of the extruded starch strand are as in Comparison Example 3. The granulate produced has a water content of 6% to 8% compared to a water content of 10% of the corn starch used.

| Color | cloudy, yellowish |
|---|---|
| Melt viscosity | not measurable (160° C./236.N) |
| Impact strength | no breakage |

COMPARISON EXAMPLE 5

The procedure of Comparison Example 3 is repeated except that the torsional moment was 115% (throughput: 6 kg/h) and 80 parts of corn starch, having an amylose content (based on the starch) of 70%, and 20 parts of glycerol are used. Strand enlargement and flexibility of the extruded starch strand are as in Comparison Example 3. However, the starch mass requires such high torsional moment that the screws are blocked. The granulate produced has a water content of 5% to 7% compared to a water content of 10% of the corn starch used.

| Color | cloudy, yellowish |
| --- | --- |
| Melt viscosity | not measurable (160° C./236.4 N) |
| Impact strength | no breakage |

COMPARISON EXAMPLE 6

The procedure of Comparison Example 1 is repeated except that the torsional moment is 50% to 70% (throughput: 8 kg/h); corn starch having an amylose content (based on the starch) of 70% and 15% of sorbitol and 15% of glycerol are used as the plasticizer. Strand enlargement and flexibility of the extruded starch strand are as in Comparison Example 3. The granulate produced has a water content of 5% to 8% compared to the water content of 10% of the corn starch used.

| Color | yellowish, partly clear |
| --- | --- |
| Melt viscosity | not measurable (160° C./236.4 N) |
| Impact strength | no breakage |

COMPARISON EXAMPLE 7

The procedure of Comparison Example 6 is repeated except that corn starch having an amylose content of 50% (based on the starch) is used. Strand enlargement and flexibility of the extruded starch strand are as in Comparison Example 6. The granulate produced has a water content of 5% to 8% compared to a water content of 12% of the corn starch used.

| Color | yellowish, partly clear |
| --- | --- |
| Melt viscosity | not measurable (160° C./236.4 N) |
| Impact strength | 6.3 kJ/m$^2$. |

COMPARISON EXAMPLE 8

The procedure of Comparison Example 6 is repeated except that hydroxypropyl corn starch having an amylose content of 50% (based on the starch) is used. Strand enlargement and flexibility of the extruded strand are as in Comparison Example 6. The granulate produced has a water content of 5% to 8% compared to a water content of 10% of the hydroxypropyl corn starch used.

| Color | yellowish, partly clear |
| --- | --- |
| Melt viscosity | 30,000 Pa.s (160° C./236.4 N) |
| Impact strength | no breakage. |

COMPARISON EXAMPLE 9

The process of Comparison Example 8 is repeated except that it was carried out at a throughput of 8 to 9 kg/h and 14.8 parts of sorbitol plus 0.2 parts of glycerolmonostearate (instead of 15 parts of sorbitol) are used. Strand enlargement and flexibility of the extruded strand are as in Comparison Example 6. The granulate produced has a water content of about 6% relative to a water content of 10% of the hydroxypropyl corn starch used.

| Color | slightly yellowish, almost transparent |
| --- | --- |
| Melt viscosity | 15,000 Pa.s (160° C./236.4 N) |
| Impact strength | no breakage |

COMPARISON EXAMPLE 10

The extruder of Comparison Example 1 is used with the process and materials of Example 1. The starch mass requires such high torsional that the screws are blocked. The very thin liquid melt is not suitable for the production of granulate.

| Color | clear, yellowish |
| --- | --- |
| Melt viscosity | 500 Pa.s (160° C./236.4 N) |
| Impact strength | no breakage |

COMPARISON EXAMPLE 11

A melt is produced from 60 parts of hydroxypropyl corn starch, having a degree of substitution of 0.06 and an amylose content (based on the starch) of 50%, and 40 parts of glycerol using the extruder of Comparison Example 1. The very thin liquid melt is very tacky and did not solidify after cooling. It is, therefore, not possible to produce a granulate.

| Color | clear, yellowish |
| --- | --- |
| Melt viscosity | 2,000 Pa.s (160° C./236.4 N) |
| Impact strength | not measurable. |

COMPARISON EXAMPLE 12

The procedure of Comparison Example 1 is repeated except that the extruder of FIG. 2 is used and the torsional moment is 100% (throughput: 6 kg/h). 12.8 parts of sorbitol, 0.2 parts of magnesium stearate, and 2 parts of urea are pre-mixed, and are then introduced into at inlet 7 into zone 1, along with 70 parts of hydroxypropyl corn starch having a degree of substitution of 0.06 and an amylose content (based on the starch) of 50%, through two separate metering weighing belts. After passing through first kneading zone 11, 15 parts of glycerol is added via a liquid metering device at feed opening 8 of zone 2. The remainder of the process is as in Comparison Example 3.

The resulting extruded strand is flexible only over short regions and contains repeated brittle points. The granulate produced therefrom has a water content of 5% to 7% compared to a water content of 9% to 12% of the starch used and is useless for thermoplastic processing.

| Color | transparant, yellowish |
| --- | --- |
| Melt viscosity | 2,000 Pa.s (160° C./236.4 N) |
| Impact strength | not measurable |

While only a limited number of specific embodiments of the present invention have been expressly disclosed, it is, nonetheless, to be broadly construed and not to be limited except by the character of the claims appended hereto.

What we claim is:

1. A process for the production of a homogeneous, thermoplastically processible starch melt comprising a. introduction of a chemically modified starch into a first intake zone of an extruder and conveyance of said starch to a second receiving zone, b. addition of a prehomogenized, anhydrous liquid mixture of plasticizer, emulsifier, and at least one additive, mixing and subsequent conveyance of said starch and said liquid mixture through said second receiving zone at a first elevated temperature to form a blended mixture thereof, c. destructurization, in a third destructurization zone, of said modified starch, without adding any water, and conveyance of said blended mixture therethrough at a second elevated temperature to form said homogeneous, thermoplastically processible melt, d. degassing of said melt in and conveyance of said melt through a fourth degassing zone at a third elevated temperature and under reduced pressure to form a degassed melt, and e. extrusion of said degassed melt through a die at a fourth elevated temperature and elevated pressure.

2. The process of claim 1 wherein said additive is selected from the group consisting of urea, and compounds thereof, and mixtures thereof.

3. The process of claim wherein said first elevated temperature, said second elevated temperature, said third elevated temperature, and said fourth elevated temperature are 100° to 170° C., said reduced pressure is $-2.5 \times 10^4$ Pa to $-6.0 \times 10^4$ Pa, and said elevated pressure is $2.0 \times 10^6$ Pa to $1.0 \times 10^7$ Pa.

4. The process of claim 1 wherein said modified starch has a natural water content of 5% to 16%, based on said modified starch.

5. The process of claim 1 wherein said modified starch has an amylose content of 20% to 100%, based on said modified starch.

6. The process of claim 1 wherein said modified starch is selected from the group consisting of urea, alkylene oxides, ether-, ester-, urethane-, carbamate-, isocyanate reaction products with starch, and mixtures thereof.

7. The process of claim 6 wherein said modified starch has a degree of substitution of 0.05 to 3.0.

8. The process of claim 1 wherein said plasticizer has at least one hydroxyl group.

9. The process of claim 8 wherein said plasticizer is selected from the group consisting of sorbitol, mannitol, D-glucose, glycerols, ethylene glycol, polyethylene glycols, propylene glycol, and mixtures thereof.

10. The process of claim wherein said plasticizer is present in an amount of 4.8% to 39.8% based on said melt.

11. The process of claim 1 wherein said additive is 0.1% to 5.0% based on said melt.

12. The process of claim 1 wherein at least one said emulsifier has an HLB value of 0 to 20.

13. The process of claim 1 wherein said emulsifier is selected from the group consisting of metal stearates, glycerol monostearate, polyoxyethylene (20)-sorbitan monolaurate, polyoxyethylene (20)-sorbitan monopalmitate, polyoxyethylene (40)-stearate, polyoxyethylene (100)-stearate, and mixtures thereof.

14. The process of claim 1 wherein said emulsifier is present in an amount of 0.1% to 2.0% based on said melt.

15. The process of claim 1 wherein said liquid mixture comprises at least one plasticizer having a melting point below 60° C., and said liquid mixture being prehomogenized at about 60° C.

16. A process for the production of a homogeneous, thermoplastically processible starch melt comprising a. separate introduction of a chemically modified starch and at least one plasticizer, which has a melting point above 60° C., into a first intake zone of an extruder, mixing and conveying said starch and said plasticizer through said intake zone to form a blend thereof, b. addition of a prehomogenized, anhydrous liquid mixture comprising an optional plasticizer, an emulsifier, and at least one additive, mixing and conveyance of said blend and said liquid mixture through a second receiving zone at a first elevated temperature to form a blended mixture thereof, c. destructurization, in a third destructurization zone, of said modified starch, conveyance of said blended mixture through said destructurization zone at a second elevated temperature without adding any water to form said homogeneous, thermoplastically processible starch melt, d. degassing of said melt and conveyance of said blended mixture through a fourth degassing zone at a third elevated temperature and reduced pressure to form a degassed melt, and e. extrusion of said melt through a die at a fourth elevated temperature and elevated pressure.

17. The process of claim 16 wherein said first elevated temperature, said second elevated temperature, said third elevated temperature, and said fourth elevated temperature are 100° to 170° C., said reduced pressure is $-2.5 \times 10^4$ Pa to $-6.0 \times 10^4$ Pa, and said elevated pressure is $2.0 \times 10^6$ Pa to $1.0 \times 10^7$ Pa.

18. The process of claim 16 wherein said modified starch has a natural water content of 5% to 16%.

19. The process of claim 16 wherein said modified starch has an amylose content of 20% to 100%.

20. The process of claim 16 wherein said modified starch is the reaction product of its hydroxyl groups with a compound selected from the group consisting of urea, alkylene oxides, ether-, ester-, urethane-, carbamate-, isocyanate reaction products with starch, and mixture thereof.

21. The process of claim 16 wherein said modified starch has a degree of substitution of 0.05 to 3.0.

22. The process of claim 16 wherein said plasticizer has at least one hydroxyl group.

23. The process of claim 16 wherein said plasticizer is selected from the group consisting of sorbitol, mannitol, D-glucose, glycerols, ethylene glycol, polyethylene glycols, propylene glycol, and mixtures thereof.

24. The process of claim 16 wherein said plasticizer is present in an amount of 4.8% to 39.8% based on said melt.

25. The process of claim 16 wherein said additive is selected from the group consisting of urea and compounds thereof, and mixtures thereof.

26. The process of claim 16 wherein said additive is 0.1% to 5.0% based on said melt.

27. The process of claim 16 wherein at least one said emulsifier has an HLB value of 0 to 20.

28. The process of claim 16 wherein said emulsifier is selected from the group consisting of metal stearates, glycerol monostearate, polyoxyethylene (20)-sorbitan monolaurate, polyoxyethylene (20)-sorbitan monopalmitate, polyoxyethylene (40)-stearate, polyoxyethylene (100)-stearate, and mixtures thereof.

29. The process of claim 16 wherein said emulsifier is present in an amount of 0.1% to 2.0% based on said melt.

30. The process of claim 16 wherein said plasticizer comprises a first compound having a melting point above 60° C. and a second compound having a melting point below 60° C., said first compound being added separately with said starch into said intake zone and said second compound being added in said liquid mixture in said receiving zone.

* * * * *